United States Patent [19]

Halling et al.

[11] 4,448,449
[45] May 15, 1984

[54] FLEXIBLE PIPING JOINT AND METHOD OF FORMING SAME

[76] Inventors: Horace P. Halling, 6708 McCahill Ter., Laurel, Md. 20810; Bernard J. Sadoff, Jr., 4524 Hornbeam Dr., Rockville, Md. 20853

[21] Appl. No.: 260,162

[22] Filed: May 4, 1981

[51] Int. Cl.³ .................. F16L 27/04; F16L 25/00; F16L 33/18
[52] U.S. Cl. .................. 285/263; 285/381; 285/351; 285/DIG. 11; 285/DIG. 14
[58] Field of Search .............. 285/263, 264, 381, 330, 285/351, DIG. 11, DIG. 14

[56] References Cited

U.S. PATENT DOCUMENTS

| | | | |
|---|---|---|---|
| 1,063,389 | 6/1913 | Robbins | 285/263 X |
| 1,368,786 | 2/1921 | DeGraff | 285/263 X |
| 2,840,394 | 6/1958 | Rohr | 285/263 X |
| 4,071,269 | 1/1978 | Halling et al. | 285/263 X |

*Primary Examiner*—Richard J. Scanlan, Jr.
*Attorney, Agent, or Firm*—Roylance, Abrams, Berdo & Goodman

[57] ABSTRACT

A fluid-tight coupling and sealing apparatus for first and second tubes having high pressure fluid flowing therethrough comprising a non-metallic ring rigidly received in the first tube via an interference shrink-fit and a metallic, resilient annular sealing element rigidly coupled to and extending from the second tube and having a ring portion with a curved outer surface in contact via an interference fit with the inner surface of the non-metallic ring. The coefficient of friction between the metallic sealing element and the non-metallic ring is low, to minimize the moment required to angulate the apparatus under load, and the wear properties are optimal, to decrease the chance of galling along the sealing line and thus loss of sealing. The non-metallic ring is preferably formed of carbon-graphite and is rigidly secured in the first tube by first heating the tube to thereby increase its size by thermal expansion; inserting the non-metallic ring, which is at room temperature, into the heated tube; and then allowing the tube to cool and therefore reduce in size into an interference shrink-fit contact with the outer surface of the ring. Following this, the resilient sealing element is inserted into the non-metallic ring with an interference fit.

20 Claims, 6 Drawing Figures

FLEXIBLE PIPING JOINT AND METHOD OF FORMING SAME

FIELD OF THE INVENTION

The invention relates to a fluid-tight coupling and sealing apparatus for two tubes having high pressure fluid flowing therethrough capable of angular and rotational flexibility. The apparatus includes a metallic, resilient annular sealing element coupled to one of the tubes and a non-metallic ring, formed for example of carbon-graphite, coupled via an interference shrink-fit to the inside of the other tube, the non-metallic ring receiving the sealing element therein via an interference fit. Assemblies are provided to limit the extent of both the angular and rotational flexibility.

BACKGROUND OF THE INVENTION

Piping systems for high pressure and temperature fluids are generally designed to provide some degree of flexibility to allow for dimensional tolerances, thermal expansion and contraction, and vibrational deflections between the various components which are connected by the piping. Lightweight compact assemblies, which are particularly desirable in aircraft and missile systems, for providing such flexibility are known in the prior art; however, these prior art devices generally employ elastomeric, plastic, rubber or asbestos type seals to prevent leakage of the fluid flowing in the flexible system. A shortcoming of these types of seals is that they tend to fail when exposed to high temperatures above approximately 400° F.–500° F., very low temperatures, or radiation.

Typically, sealing assemblies used in flexible piping systems in environments beyond the capability of seals made of elastomers and the like employ sections of piping with circumferential corrugations, i.e., bellows, expansion loops, or devices containing piston rings. However, these devices are generally very heavy, require large amounts of space, and are prone to failure and, therefore, leakage, due to fragility and wear. Moreover, these sealing systems often require exact tolerances and are difficult to manufacture and install.

Solving these problems, it is known to utilize metal to metal seals in such an environment as disclosed in prior U.S. Pat. Nos. 4,054,306; 4,071,268 and 4,071,269, issued to the inventors herein. At higher temperatures, above for example 900° F., the seals disclosed in these three patents perform extremely satisfactorily and leakage of fluid is minimal. This is because while a rubbing action of the two metallic parts, which are in sliding contact, tends to gall the contacting parts, an oxide film is continuously formed, maintaining a lubricious, non-galling surface. However, it has been noted that at more moderate temperatures this oxide film does not regenerate and thus galling tends to roughen the metallic surfaces, thereby increasing the chance of leakage of fluid between them.

In addition to maintaining the seal between joined pipes, it is important to provide a mechanism that allows for rotation and angulation between adjacent pipes. Typically, the prior art flexible joint devices include bellows-sealed gimbal, hook or ball joints, none of which combine the necessary capabilities in a light and compact arrangement.

Moreover, many of the prior art devices which allow for flexibility do not provide for a mechanism to limit relative rotation while allowing angular misalignment and they do not provide for a positive and reliable limit to angular misalignment.

Examples of such prior art devices are disclosed in the following U.S. Pat. Nos. 1,155,495 to Leake; 2,005,556 to Parker; 2,451,437 to Fenlon; 2,502,753 and 2,840,394 to Rohr; 2,846,242 to Drake; 3,033,595 to Bard; 3,165,339 to Faccou; 3,663,043 to Walton; 3,656,784 to Dow et al; 3,799,586 to Caras et al; 3,995,896 to Decker; 4,006,881 to Gaillard; and 4,165,107 to Affa et al.

SUMMARY OF THE INVENTION

Accordingly, it is a primary object of the present invention to provide a fluid-tight coupling and sealing apparatus for a pair of tubes having high pressure fluid flowing therethrough with an effective seal that can work at moderate temperatures and that is capable of angular and rotational flexibility.

Another object of the present invention is to provide such a fluid-tight coupling and sealing apparatus which is light in weight and compact in volume so as to be readily used in aircraft systems, and which has low friction between moving parts to minimize the movement required to angulate the apparatus and has optimal wear properties to provide high wear endurance.

Another object is to provide a fluid-tight coupling and sealing apparatus which can transmit tension loads due to pressure across the flexible joint joining the two tubes and which can withstand high acceleration forces and vibrational loads at extreme temperatures and under the influences of radiation.

Another object of the invention is to provide such a coupling that can limit relative rotation while allowing angular misalignment and can positively limit the degree of such angular misalignment.

A further object is to provide an efficient and reliable method of forming such a fluid-tight coupling and sealing apparatus.

The foregoing objects are basically attained by providing a fluid-tight coupling and sealing apparatus for a first tube and a second tube having high pressure fluid flowing therethrough, the combination comprising a non-metallic ring rigidly received in the first tube via an interference shrink-fit between the outer surface of the ring and the inner surface of the first tube; and a metallic, resilient, annular sealing element rigidly coupled to and extending from the second tube, the sealing element having a ring portion with a curved outer surface having a maximum free diameter greater than the inner diameter of the inner surface of the non-metallic ring and in contact via an interference fit with the inner surface of the non-metallic ring, the coefficient of friction between the material of said non-metallic ring and the material of said metallic sealing element being less than the coefficient of friction between the material of said metallic sealing element and the material of the first tube.

Advantageously, the non-metallic ring is formed from carbon-graphite such as that manufactured by the Pure Carbon Company under their trademark Purebon, type P-3310, which is self-lubricating and non-galling. The sealing element is formed of precipitation hardenable stainless steel or a nickel-chromium alloy.

A guide mechanism is also provided between the two tubes to provide for controlled angular misalignment and relative rotation between the two tubes. The guide mechanism includes an assembly to limit the amount of relative rotation and an assembly for positively limiting the amount of angular misalignment. This mechanism also prevents separation of the tubes under tension forces.

Because the non-metallic ring has a low coefficient of friction, galling at the ring and sealing element interface at moderate temperatures is prevented and therefore the chance of leakage is diminished, the moment required to angulate the apparatus is minimized and the wear endurance is increased. Because the metallic sealing element is resilient, the apparatus is self-adjusting as the ring is worn away during use.

In forming the coupling and sealing apparatus, the non-metallic ring is rigidly secured in the first tube by first heating the tube to thereby increase its size by thermal expansion; inserting the non-metallic ring, which is at room temperature, into the heated tube; and then allowing the tube to cool and therefore reduce in size into an "interference shrink-fit" contact with the outer surface of the ring. This provides an advantageous method of coupling the non-metallic ring to the tube and preventing their relative motion upon application of high temperatures due to the different coefficients of thermal expansion of the non-metallic ring and the tube, which is preferably metallic. Following this, the sealing element is inserted into the non-metallic ring with an "interference fit".

As used herein, the phrase "interference fit" means that with the sealing member curved surface having a slightly larger free diameter prior to installation than the diameter of the cylindrical inner surface of the non-metallic ring and with the curved surface being resilient, on forcing the curved surface into the ring the sealing member will be elastically deformed and thus maintained in intimate circumferential contact with the ring due to the reactive force of the elastic deformation. This interference fit is different from the interference shrink-fit described above.

As used herein, the phrase "free diameter" means the diameter of the ring portion curved surface prior to installation with the non-metallic ring, and therefore prior to its elastic deformation.

Other objects, advantages and salient features of the present invention will become apparent from the following detailed description which, taken in conjunction with the annexed drawings, disclosed preferred embodiments of the present invention.

DRAWINGS

Referring now to the drawings which form a part of this original disclosure:

FIG. 2 is a side elevational view similar to that shown in FIG. 1 except the center lines of the two tubes are angularly misaligned by angle a;

Figure 6:
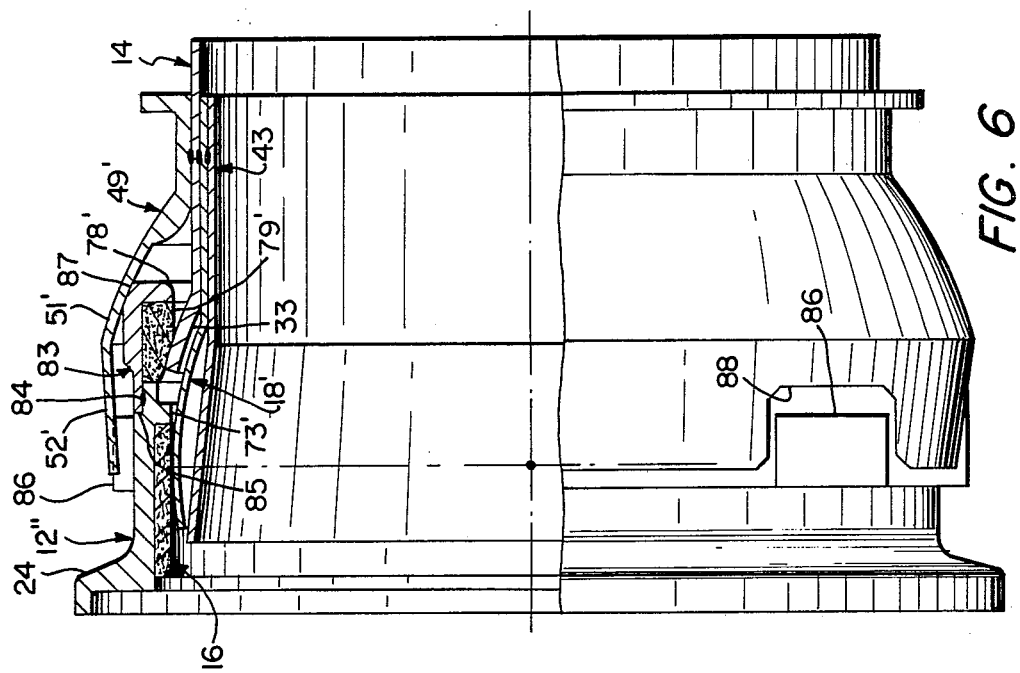
Figure 5:
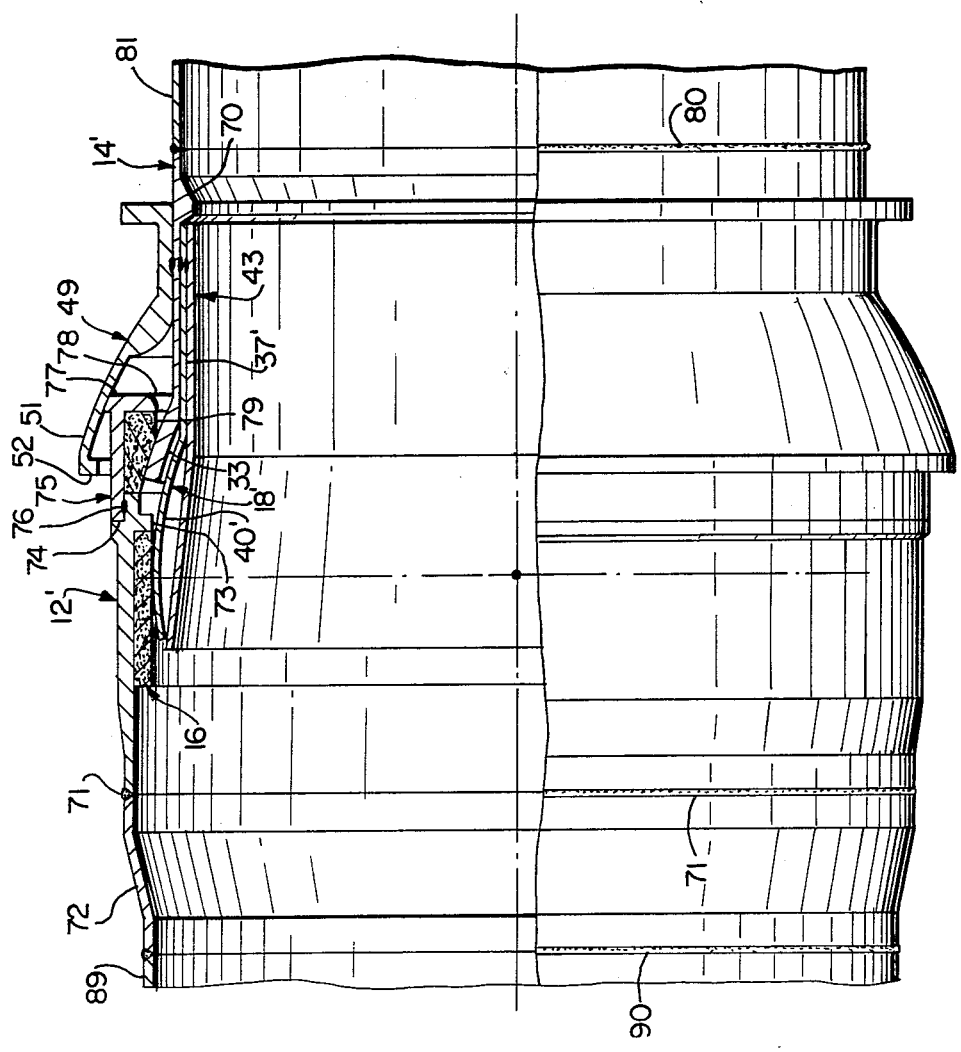

FIG. 5 is a side elevational view in partial longitudinal section of a modified embodiment of the present invention utilizing an additional non-metallic ring; and FIG. 6 is a side elevational view in partial longitudinal section of another modified embodiment of the present invention utilizing an additional non-metallic ring and providing a mechanism for limiting relative rotation between the first and second tubes.

DETAILED DESCRIPTION OF THE INVENTION AS SHOWN IN FIGS. 1–4

Referring now to FIGS. 1–4, the flexible piping joint in the form of a fluid-tight coupling and sealing apparatus 10 in accordance with the present invention is shown comprising a first tube 12, a second tube 14, a non-metallic ring 16 rigidly received in the first tube and a metallic, resilient annular sealing element 18 rigidly coupled to the second tube and extending into and in contact via an interference fit with the inside of the non-metallic ring. A guide mechanism 20 interconnects the first and second tubes and allows for angular and rotational flexibility between the coupled first and second tubes.

Figure 3:
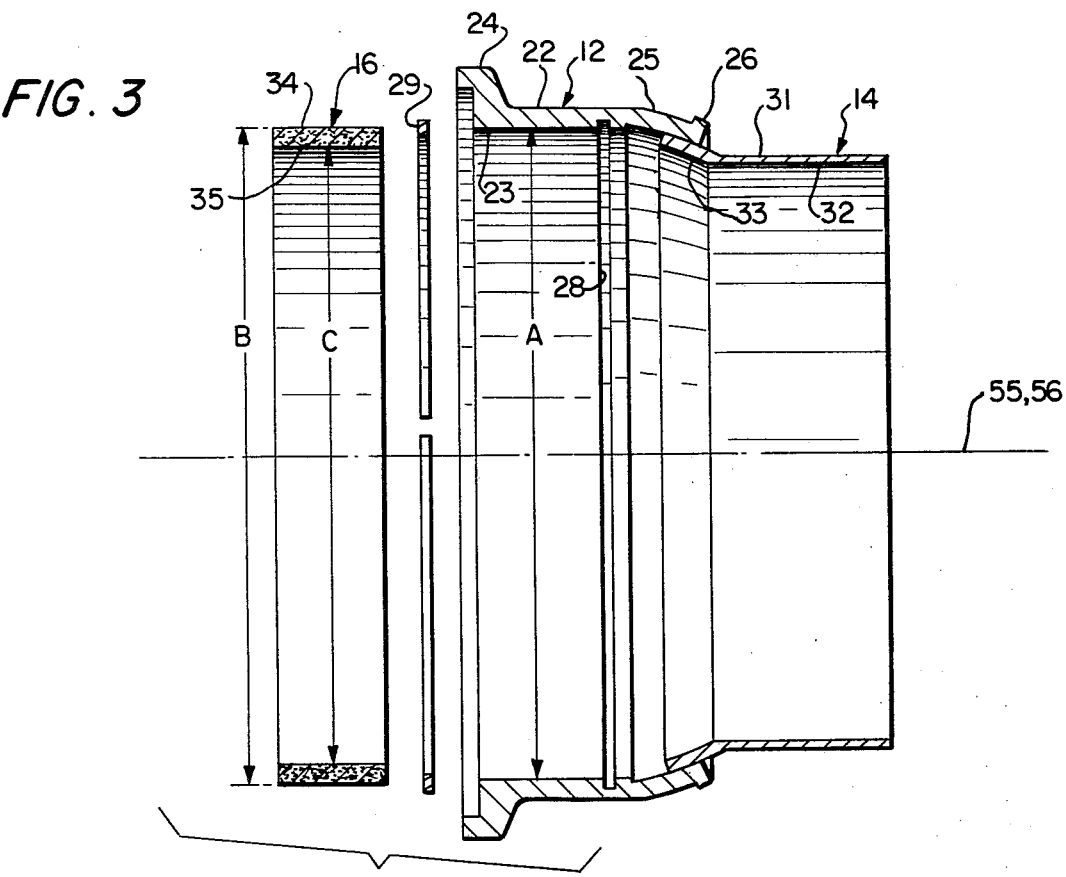
FIG. 3 is an exploded side elevational view in longitudinal section of the first and second tubes in contacting relationship with the non-metallic ring and a retaining split ring adjacent to the first tube.

As seen most clearly in FIG. 3, the first tube 12 comprises a central cylindrical portion with a cylindrical outer surface 22 and a cylindrical inner surface 23, this inner surface having a diameter A as shown in FIG. 3. On the left hand distal end of the first tube 12 is a radially outwardly extending flange 24 and on the right hand distal end is a radially inwardly directed spherical segment 25, which is part of a sphere on both its inner and outer surfaces and which has a small radially outwardly extending annular rim 26 at its distal end. This spherical segment 25 is part of a follower assembly in the guide mechanism 20, the spherical segment forming a follower.

Figure 4:
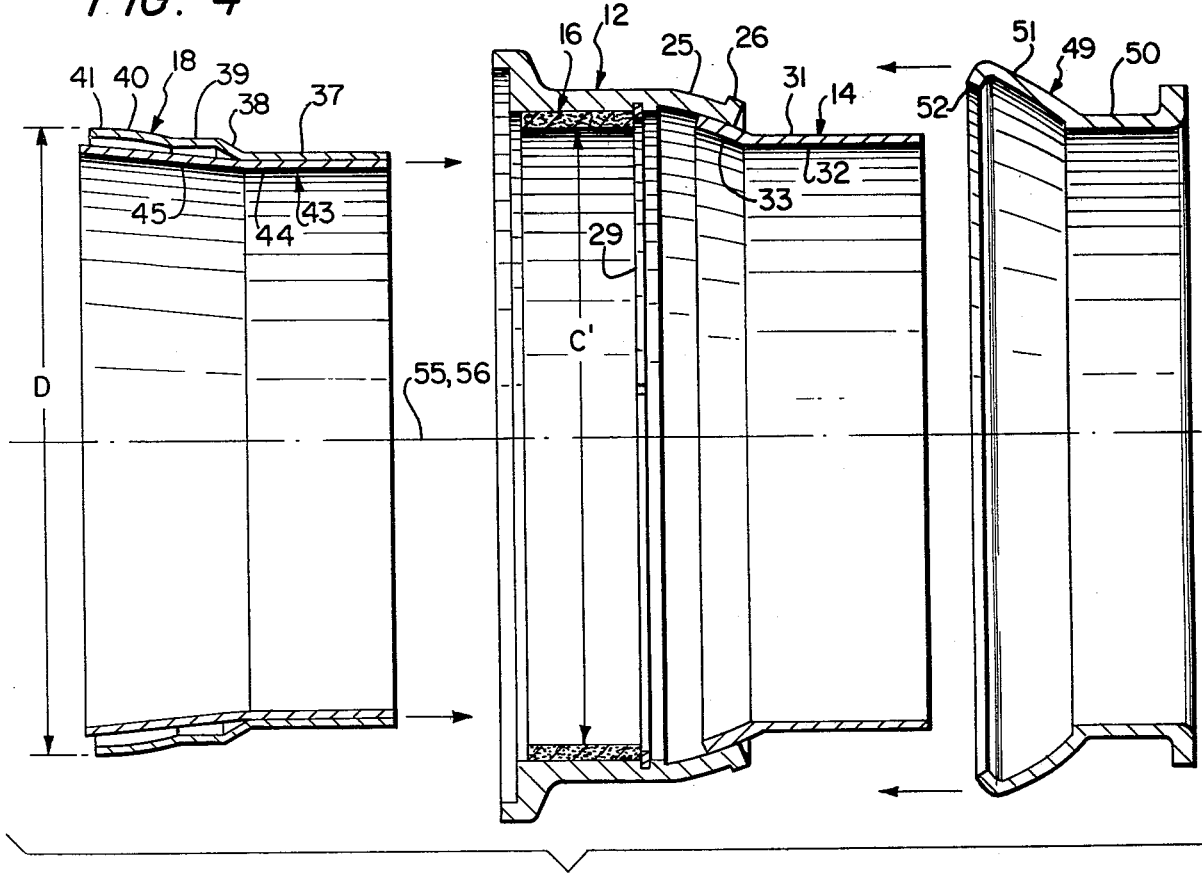
FIG. 4 is an exploded side elevational view in longitudinal section of the apparatus shown in FIG. 3 with the non-metallic ring and split ring received in the first tube and also includes the sealing element and flow liner on the left about to be inserted into the first tube and an outer annular restraint member on the right about to be coupled to the first tube.

Located in inner surface 23 of the first tube adjacent spherical segment 25 is an annular groove 28 for the reception of an annular member in the firm of a split retaining ring 29, which is shown in place in FIG. 4.

The second tube 14 seen in FIG. 3 comprises a cylindrical portion with inner and outer cylindrical surfaces 31 and 32 and a spherical segment 33 integrally formed with the cylindrical portion at the left end thereof, this spherical segment having spherical inner and outer surfaces, the outer surface being in slidable contact with and having the same radius as the inner surface of spherical segment 25 on the first tube 12. As shown in FIGS. 3 and 4, the second tube 14 has been inserted into the first tube 12 and spherical segments 25 and 33 are in slidable contact. The spherical segment 33 on the second tube 14 acts as a second arcuate ring member in the guide mechanism 20 as will be described in more detail hereinafter.

As seen best in FIG. 3, the non-metallic ring 16 has a cylindrical outer surface 34 with a diameter B and a cylindrical inner surface 35 with a diameter C. The coefficient of friction between the materials forming this non-metallic ring and the sealing element 18 is less than the coefficient of friction between the materials forming the first tube 12 and the sealing element 18, these being formed of stainless steel or an alloy of nickel and chromium. This non-metallic ring can be made from a carbon-graphite composite such as that sold by the Pure Carbon Company of St. Mary's, Pa., under the trademark Purebon, type P-3310. In addition, this ring can be formed from UCAR Mechanical Carbon Graphite manufactured by the Carbon Products Division of Union Carbide Corporation of Parma, Ohio. While the extact coefficient of friction of such carbon-graphite rings is not uniform, Union Carbide's material has been determined to have a coefficient of friction in the range of about 0.05 at 760 absolute pressure (torr) to about 0.25 at $10^{-8}$ absolute pressure (torr). It is also known that the coefficient of friction of carbon on carbon is about 0.16 and that of graphite on graphite is about 0.1. In all events, the material forming such a ring is selflubricating and nongalling at temperatures from absolute zero to the softening point of steel. It is also known regarding Purebon that when a hydrodynamic film is maintained, the coefficient of friction can be less than 0.01, but when this film is broken and boundary lubrication exists, the coefficient of friction can increase as high as 0.25 as measured with carbon on steel.

As illustrated in FIG. 3, the diameter A of the inner surface 23 of the first tube 12 is less than the diameter B of the outer surface 34 of the non-metallic ring 16. To rigidly secure the non-metallic ring into the first tube, the ring is kept at room temperature while the tube is heated to about 900°–1000° F. and the ring is inserted therein. Upon cooling, the tube shrinks around the ring and decreases its diameter in hoop compression to thereby rigidly secure the ring to the tube in an interference shrink-fit. This is shown in FIG. 4. This shrink-fit is necessary due to the much higher coefficient of thermal expansion of the first tube relative to the non-metallic ring. Typically, 0.010 inch of interference is needed at room temperature to maintain sufficient interference in a 2.5 inch diameter A of tube 12 which is heated in service to 700° F. Once inserted into the first tube, the inner diameter of ring 16 reduces slightly to diameter C' seen in FIG. 4.

The sealing element 18 shown in FIG. 4 is formed of one piece and comprises a cylindrical base portion 37, a short outwardly tapered frustoconical portion 38, a substantially cylindrical portion 39 and a ring portion 40 at the distal end which is arcuate and which has a curved outer surface 41 in the form of a spherical segment. The radius of curvature of the curved surface is substantially equal to the radius of the inner cylindrical surface 35 of the ring which maintains the contact stress between surface 41 and surface 35 as the joint is angulated, thereby ensuring no increase in the leakage rate of the fluid flowing through tubes 12 and 14 during angulation. The details of the construction and operation of the sealing element 18 are similar to those disclosed in prior U.S. Pat. Nos. 4,054,306, 4,071,268 and 4,071,269, the disclosures thereof being hereby incorporated by reference.

Figure 1:
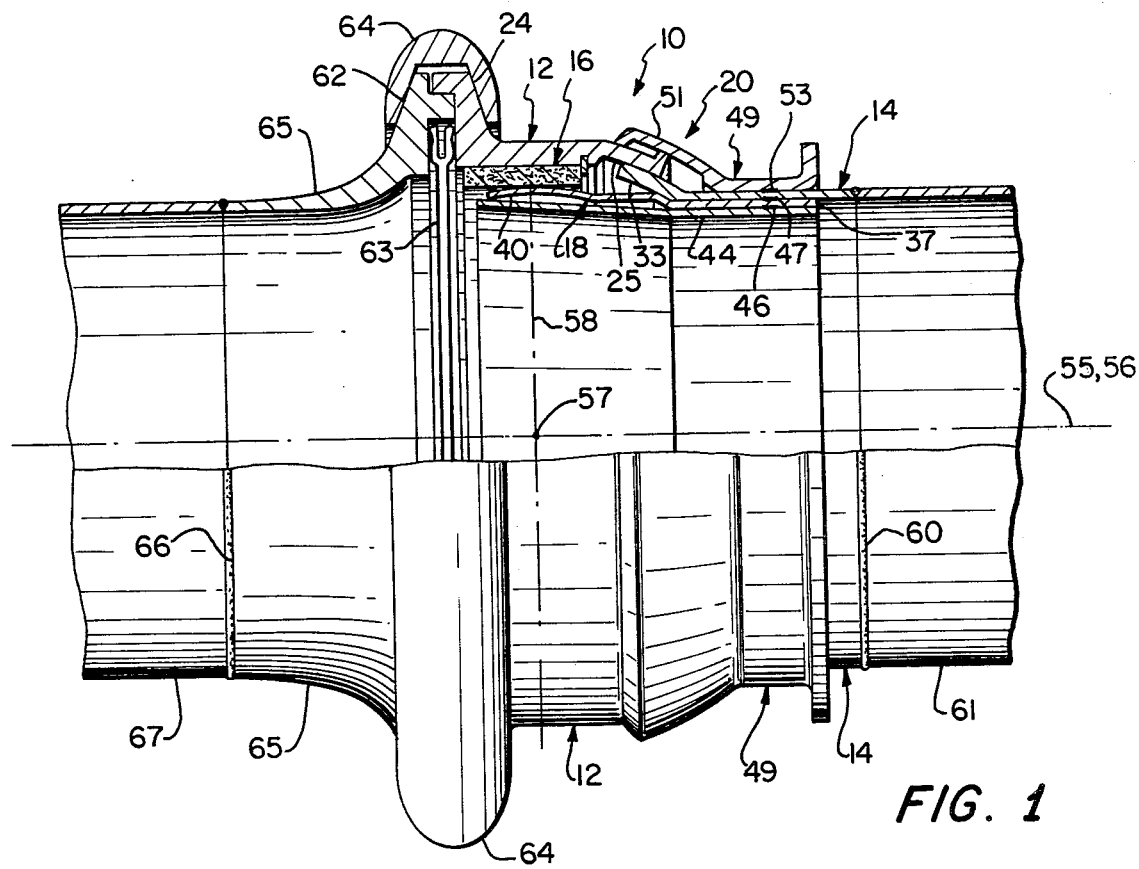
FIG. 1 is a side elevational view in partial longitudinal section of two tubes having a fluid-tight coupling and sealing apparatus thereon in accordance with the present invention, these two tubes having their center lines aligned.
Figure 2:
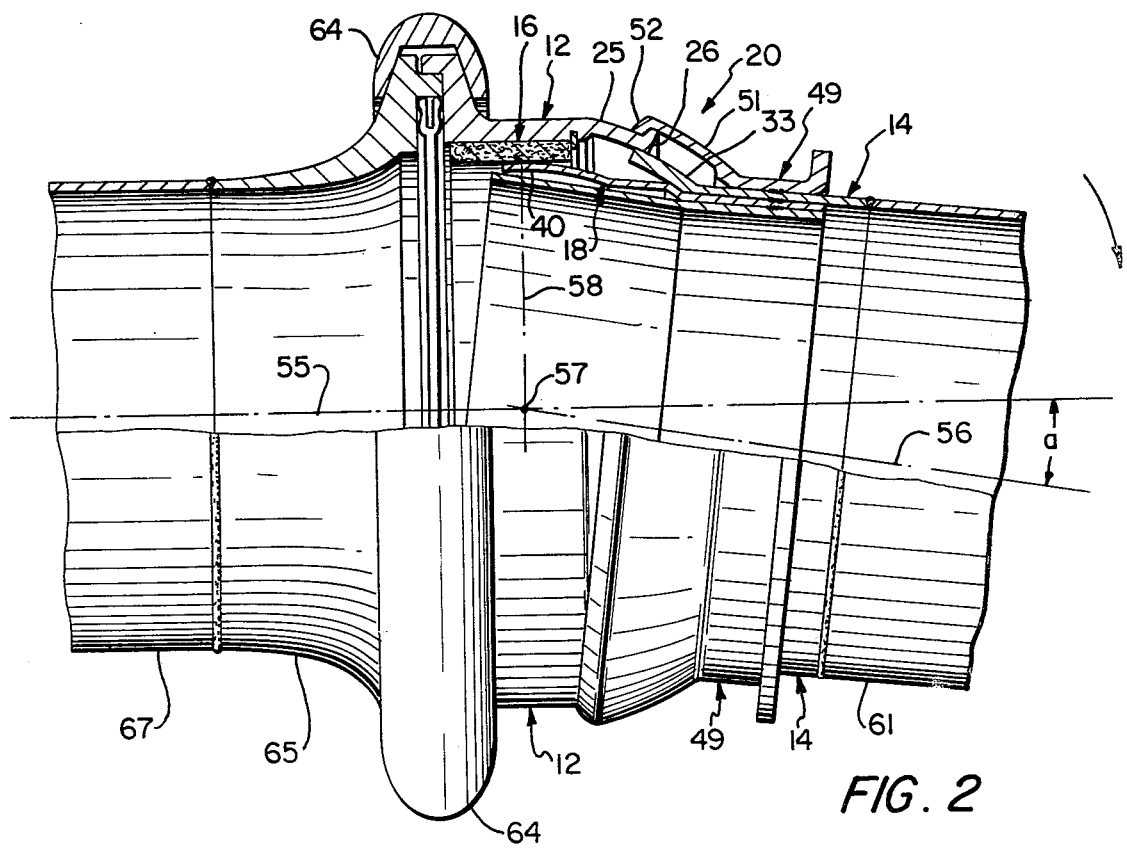

As seen in FIGS. 1 and 2, the ring portion 40 of the sealing element 18 upon assembly is received in and in contact via an interference fit with the inner surface 35 of the non-metallic ring 16. Thus, the maximum free diameter D of the curved outer surface 41 illustrated in FIG. 4 is greater than the inner diameter C' of the inserted ring 16 and upon insertion of the sealing element ring portion into the ring it remains there by means of the outwardly directed spring force of the resilient ring portion.

As seen in FIG. 4, a flow liner 43 is formed from a cylindrical base 44 and an integral outwardly tapering frustoconical portion 45, the cylindrical base 44 being rigidly coupled to the inside of cylindrical base portion 37 of the sealing element via fusion welding along circular weld line 46, as shown in FIG. 1, and the frustoconical portion 45 extends inside the ring portion 40. The outer surface of cylindrical base portion 37 of the sealing element is substantially equal to the diameter of the inner surface 32 of the second tube 14, these parts being rigidly coupled by means of a fusion weld along weld line 47 shown in FIG. 1.

The outer restraint member 49 shown in FIG. 4 comprises a cylindrical portion 50 integrally formed with an outwardly directed spherical segment 51 which has a radially inwardly directed annular rim 52 at the distal end thereof. The inner diameter of cylindrical portion 50 is substantially equal to the outer diameter of the outer surface 31 on second tube 14 and these members are rigidly coupled together by means of fusion welding along weld line 53 shown in FIG. 1. The spherical segment 51 forms a first arcuate ring member in the guide mechanism 20.

But for the non-metallic ring 16 of the apparatus shown in FIGS. 1–4, the remaining parts are metallic and can be formed from stainless steel or an alloy of nickel and chromium. Thus, but for the sealing element 18, the flow liner 43 and the outer restraint member 49, these metallic parts can be formed of Inconel 625. The sealing element can be formed of Inconel 718; the flow liner can be formed of CRES 321 or 347 (i.e., corrosion resistant steel); and the outer restraint member can be formed of CRES 321 or 347. For example, Inconel 718 is formed from approximately 52.5% nickel, 19.0% chromium, 18.0% iron, 5.2% columbium, and 3.0% molybdenum.

The static coefficient of friction of nickel on nickel is about 0.7; and the static coefficient of friction of steel on steel is about 0.80 which drops to about 0.4 after sliding is initiated. Based on tests conducted between a carbongraphite Purebon P-3310 ring and an Inconel 718 sealing element, the coefficient of friction between the ring and the sealing element has been determined to be about 0.22. Thus, the coefficient of friction between the non-metallic ring and the sealing element is considerably less than the coefficient of friction between a nickel base alloy sealing element and a nickel base alloy first tube which is approximately in the range of 0.7 to 0.8.

METHOD OF FORMING THE APPARATUS

Referring now to FIGS. 3 and 4, the first step in forming the apparatus 10 in accordance with the present invention is to insert the second tube 14 into the first tube 12 so that the outer surface of the spherical segment 33 engages the inner surface of spherical segment 25 on the first tube. Next, the retaining ring 29 is compressed and inserted into annular groove 28 where it is expanded into a rigid connection with the first tube. This subassembly is then heated to about 900° F. to 1000° F. and the non-metallic ring 16, which is at room temperature, is inserted into the first tube with clearance between the inner surface of the heated first tube and the outer surface of the ring since the tube size has been increased via thermal expansion. The ring 16 is inserted until an end contacts retaining ring 29. The diameter B of the outer surface of non-metallic ring 16 is sized to insure about 0.008–0.010 inch of interference shrink-fit with the inner surface 23 having diameter A at room temperature. The first tube is then allowed to cool to thereby allow the size of the inner surface thereof to decrease into a shrink-fitted interference contact with the outer surface of the non-metallic ring.

The inner surface of the non-metallic ring can then be machined within a tolerance of about 0.001 inches to a fine surface texture of about 8 micro-inches (RMS).

The flow liner 43 is inserted into the inside of the sealing element 18 and this combination is then inserted into the inner surface of the non-metallic ring with the curved outer surface placed in contact with the inner surface of the ring via an interference fit. The interference fit is about 0.003 to about 0.005 inch. The sealing element 18 is next rigidly coupled to the second tube 14 via fusion welding along weld line 47 and at the same time flow liner 43 is rigidly coupled to the sealing element via fusion welding along weld line 46.

Following this, the outer tubular restraint member 49 is placed in an overlying position over the spherical segment 25 on the first tube 12 as seen in FIG. 1 and the restraint member is rigidly coupled to the second tube by means of fusion welding along weld line 53.

In this configuration, the guide mechanism 20 is formed by and comprises a guiding assembly and a follower assembly. The guiding assembly comprises the first arcuate ring member or spherical segment 51 on outer restraint member 49 and the second arcuate ring member or spherical segment 33 on the second tube, which are thus spaced apart to define an arcuate cavity therebetween. The surfaces of the first and second arcuate ring members in the form of spherical segments have their spherical center point located at the intersection point of the center lines 55 of the first tube and 56 of the second tube after the tubes have been angularly misaligned along an angle a as shown in FIG. 2. This center point is designated 57 in FIGS. 1 and 2.

The follower assembly includes an arcuate follower in the form of spherical segment 25 and rim 26 formed on first tube 12 which is movable in the arcuate cavity between spherical segments 33 and 51. This follower in the form of a spherical segment has the same spherical center point at 57.

As seen in FIG. 1, the plane containing the sealing interface of the curved outer surface of ring portion 40 and the inner surface of the non-metallic ring is designated by numeral 58, such contact being a circular line with the two tubes being aligned as shown in FIG. 1. The center of this circle is also at the center point 57 of the spherical segments 25, 33 and 51.

To complete connection of the apparatus 10 in accordance with the present invention into a viable piping or ducting system, advantageously the distal end of the second tube 14 can be welded along weld line 60 to a cylindrical duct 61 with an outside diameter of about 2.25 inches. At the other end of the apparatus, flange 24 on the first tube 12 is connected to a similar flange 62 with a seal 63 interposed therebetween and with a clamp 64 being maneuvered around the two flanges to rigidly couple these flanges together. The details of the structural interrelationship of this connection are fully disclosed in U.S. Pat. No. 3,797,836, the disclosure of which is hereby incorporated by reference. Flange 62 extends into a tubular member 65 which is rigidly coupled along a weld line 66 to another cylindrical duct 67 to form a complete flow through system. This system will operate at about 95 psig at about 610° F. for the joint described. Flexible joints according to this invention are capable of operating at over 400 psig and 1100° F., with a variation of radii, diameters, and thicknesses and increase in material strength and temperature resistance.

OPERATION

As shown in FIG. 1, the first and second tubes are aligned with their center lines 55 and 56 coinciding, with sealing element 18 in contact with non-metallic ring 16 and with the spherical segment follower 25 being located between spherical segments 33 and 51.

In this condition, the first and second tubes can undergo relative rotation but cannot move axially. In addition, the two tubes can be angularly misaligned as shown in FIG. 2 in which the misalignment is through angle "a" defined between center lines 55 and 56. Advantageously, the maximum angular misalignment can be about 5°; however, the limiting angulation can be increased as desired provided the diameter of the apparatus is increased. This misalignment can be caused by a various number of factors, including thermal expansion and contraction, dimensional tolerances and mechanical deflection being placed on the tubes.

As seen in FIG. 2, the center lines 55 and 56 have their intersection at center point 57. Because of the spherical segments 25, 33 and 51, the plane containing the line of contact of the sealing interface of the ring portion 40 on sealing element 18 and the inner surface of non-metallic ring 16 also contains center point 57. Thus, the first and second tubes are made to angularly misalign along the spherical path having a center point at 57. The line of contact in FIG. 1 between the outer surface of the ring portion 40 and the non-metallic ring 16 is circular when the two tubes are aligned, and, because the sealing element outer surface is spherical, is also circular in FIG. 2 when the tubes are misaligned, with the center remaining at point 57.

In addition to providing this guiding of the angular movement of one tube relative to the other, the guide mechanism 20 formed of the spherical segments provides a limit or restraint to this angular movement when outwardly radially extending rim 26 on segment 25 engages inwardly radially extending rim 52 on segment 51, as shown in FIG. 2. Advantageously, the exterior surface of rim 26 is in slidable contact with the inner surface of segment 51 and similarly the inner surface of rim 52 is in slidable contact with the outer surface of segment 25. Moreover, the inner surface of segment 25 is in slidable contact with the outer surface of segment 33.

Because the non-metallic ring 16 is formed of material, such as carbon-graphite, having a low coefficient of friction, harmful galling does not take place and thus the required seal between these members is maintained.

EMBODIMENT OF FIG. 5

A modified embodiment of the present invention is shown in FIG. 5 in which the first tube is somewhat modified and a different type of follower is utilized in the guide mechanism. In addition, the sealing element is modified to eliminate the frustoconical portion 38 and the substantially cylindrical portion 39 shown in FIG. 4.

Thus, the sealing element 18' comprises a cylindrical portion 37' rigidly coupled to the second tube 14' and an arcuate ring portion 40' in contact with non-metallic ring 16. On the inner surface of the second tube 14' an annular rim 70 is integrally provided and extends radially inwardly in contact with the distal ends of the sealing element 18' and the flow liner 43.

The first tube 12' is without flange 24 shown in FIG. 1 and is welded along weld line 71 to a tubular adaptor 72 on the left side seen in FIG. 5 which is in turn welded along weld line 90 to duct 89. Rather than having a removable retaining ring such as ring 29 shown in FIGS. 1-4, the first tube 12' has an integral annular member in the form of a radially inwardly directed flange 73 which contacts and abuts an edge of the non-metallic ring 16. Tube 14' is welded along weld line 80 to duct 81.

Rather than the follower in the form of spherical segment 25 as shown in FIG. 1, the first tube 12 is provided with an annular recess 74 on its outer surface at its right distal end to receive a third tube 75 which is rigidly coupled via weld line 76 and acts as a follower. This third tube has a radially outwardly extending annular rim 77 which has an arcuate outer surface in contact with spherical segment 51 on outer restraint member 49 and a radially inwardly extending annular flange 78. A second non-metallic ring 79 is rigidly received inside the third tube 75 by means of an interference shrink-fit such as that between ring 16 and the first tube described above and is also interposed between flange 78 and the distal edge of the first tube 12' below recess 74.

In forming the apparatus shown in FIG. 5, once the second non-metallic ring 79 is shrink-fitted to the third tube 75, this third tube is rigidly coupled to the first tube 12' via weld line 76. This is followed by the step of engaging the spherical segment 33 on the second tube 14' with the inner surface of the second non-metallic ring 79. This inner surface is in the form of a spherical segment and corresponds to the outer spherical segmented surface of spherical segment 33. The remaining steps outlined above are then followed to complete forming the apparatus shown in FIG. 5.

In operation, angular misalignment of the apparatus shown in FIG. 5 is similar to that shown and described above regarding FIG. 2 with the non-metallic ring 79 slidably moving across the outer surface of spherical segment 33 and with the outer surface of rim 77 sliding across the inner surface of spherical segment 51. Engagement of rim 77 and rim 52 limits the amount of angular misalignment of the first and second tubes.

EMBODIMENT OF FIG. 6

A further modified embodiment of the present invention is shown in FIG. 6 which also provides a limit to angular misalignment of the first tube 12" and second tube 14 but additionally provides a stop or limit to relative angular rotation therebetween.

The first tube 12" includes a flange 24 similar to that shown in FIG. 1 and also has a third tube 83 rigidly coupled thereto via weld line 84 between the third tube and the first tube. This third tube is received in an annular recess 85 at the distal end of the first tube above an integral annular flange 73' which abuts an edge of the non-metallic ring 16 shrink-fitted to the tube 12". The first tube also has a plurality of radially outwardly extending fingers 86 in the form of parallelopipeds which form a part of the stop mechanism for relative rotation.

A second non-metallic ring 79' is shrink-fitted inside the third tube 83 and is received between a distal edge of the first tube 12' and a radially inwardly extending flange 78' on the distal edge of the third tube. A surface 87 in the form of a spherical segment is formed on an outer corner of the third tube adjacent flange 78' in slidable contact with the inner surface of a spherical segment 51 on the outer restraint member 49'. The spherical segment 33 on the second tube 14 is in slidable contact with the inner substantially spherically segmented surface of the second non-metallic ring 79'.

Forming the other part of the stop mechanism is a rim 52' integrally formed with spherical segment 51' on the outer restraint member 49', this rim 52' having a plurality of substantially rectangular slots 88 formed therein having a width slightly larger than the width of the plurality of fingers 86 on the first tube 12'. This rim 52' extends radially inward and towards the first tube.

The apparatus shown in FIG. 6 is formed substantially the same way as that shown in FIG. 5 except that before the outer restraint member 49' is overlaid over the third tube it is rotatably oriented relative to the first tube so that the slots 88 align with and receive the fingers 86.

In operation, relative rotation between the first and second tubes is stopped or limited by contact of the fingers with the sides of the slots. Since there is some clearance therebetween, there will be a limited amount of such relative rotational movement. If necessary, even this slight movement can be eliminated by changing the shape of the fingers 86 from parallelopiped to cylindrical and reducing the clearance between the fingers and the edges of the slots, although this involves additional machining costs.

To restrict or limit angular misalignment of the tubes shown in FIG. 6, the third tube 83, which acts as a follower, will contact the inner surface of the annular rim 52' coupled to the outer restraint member 49'. As in the case of FIG. 5, the third tube 83' is movable through an annular cavity formed between spherical segment 51' on restraint member 49' and spherical segment 33 on the first tube 14.

Advantageously, the embodiments shown in FIGS. 5 and 6 can be operated with fluid flowing therethrough at about 158 psig at about 1050° F., although flexible joints according to this invention can be operated at over 400 psig and 1100° F. with a variation of radii, diameters, and thicknesses and increase in material strength and temperature resistance.

In addition, the outer restraint members 49 and 49' in FIGS. 5 and 6 can be formed of Inconel 625.

Regarding the interference shrink-fit contact of the non-metallic ring and the first tube in FIGS. 1-6, the necessary amount is basically determined by the equation $I=(\alpha T - \alpha R)A(T2-T1)$, where $\alpha T$ is the coefficient of thermal expansion of the first tube over the operating temperature range, $\alpha R$ is the coefficient of thermal expansion of the ring over the operating temperature range, A is the interface diameter of the ring and tube at room temperature, T2 is the maximum operating temperature of the apparatus, and T1 is the initial (room) temperature of the apparatus. With $\alpha T=7.4\times 10^{-6}$, $\alpha R=2.3\times 10^{-6}$, A=2.5275 inches, T2=610° F. and T1=70° F., then I=0.007 inches. To ensure sealing between the ring and tube at 610° F., the minimum interference is set at 0.008 inch. Tolerances on the tube inner diameter and ring outer diameter of 0.001 inch each, produce a range of 0.008-0.010 inch interference at room temperature.

By utilizing the combination of a non-metallic ring, formed for example of carbon-graphite, and a metallic sealing element, formed for example of a nickel base alloy, the friction between the moving parts of the apparatus is reduced and the wear endurance is increased. Since friction is reduced, the moment required to angulate the flexible joint is lessened, leading to a smoother and more efficient and reactive joint. The life of an individual joint is also significantly increased over the metal to metal sealing and coupling shown, for example, in U.S. Pat. No. 4,071,269. Based on tests, it is estimated that the usable life of a joint in accordance with the present invention is about 20 times that shown in U.S. Pat. No. 4,071,269. This usable life is measured by the time it takes for the joint to deteriorate to a point where the leakage rate of the fluid flowing therethrough becomes unacceptable. One apparent reason for this is that the metallic sealing element ring portion becomes coated with carbon graphite from the ring after approximately several hours of use at operating temperatures.

Moreover, by utilizing this combination of the non-metallic ring and the resilient metallic sealing element, the apparatus is self-adjusting. That is, as the non-metallic ring is worn away during use, the resilient sealing element (in an interference fit with the ring) expands outwardly to take this into account and take up the clearance otherwise generated. In addition, the transfer of carbon-graphite material from the ring to the sealing element minimizes the decrease in interference.

The embodiments of the invention illustrated in the drawings are intended for use with ducts having outside diameters in the range of 2.25 to 2.50 inches, although the invention is capable of use with ducts typically having outside diameters from 1.00 to 6.00 inches.

While various embodiments have been chosen to illustrate the present invention, it will be understood by those skilled in the art that various changes and modifications can be made therein without departing from the scope of the invention as defined in the appended claims.

What is claimed is:

1. A fluid-tight coupling and sealing apparatus for a first tube and a second tube having high pressure fluid flowing therethrough, the combination comprising:
   a non-metallic ring rigidly received in the first tube via an interference shrink-fit between the outer surface of said ring and the inner surface of the first tube; and
   a metallic, resilient, annular sealing element rigidly coupled to and extending from the second tube,
   said sealing element having a ring portion with a curved outer surface having a maximum free diameter greater than the inner diameter of the inner surface of said non-metallic ring and in contact via an interference fit with the inner surface of said non-metallic ring,
   the coefficient of friction between the material of said non-metallic ring and the material of said metallic sealing element being less than the coefficient of friction between the material of said metallic sealing element and the material of the first tube,
   the interference shrink-fit between said non-metallic ring and said first tube equaling $(\alpha T - \alpha R)A(T2-T1)+0.001$ inch, where $\alpha T$ is the coefficient of thermal expansion of said first tube over the operating temperature range, $\alpha R$ is the coefficient of thermal expansion of said non-metallic ring over the operating temperature range, A is the interface diameter of said ring and said first tube, T2 is the maximum operating temperature of the apparatus, and T1 is the initial temperature of the apparatus, to maintain the interference fit between said sealing element and said ring over the operating temperature of the apparatus.

2. An apparatus according to claim 1, wherein said non-metallic ring is formed of carbon-graphite.

3. An apparatus according to claim 1, and further comprising
   stop means, coupled to the first and second tubes, for limiting the extent of relative rotational movement between the first and second tubes.

4. An apparatus according to claim 1, and further comprising
   means, coupled to the first and second tubes, for limiting relative angular movement between the first and second tubes.

5. An apparatus according to claim 1, and further comprising
   guiding means, coupled to the first and second tubes, for maintaining the intersection point of the center lines of the first and second tubes during angular misalignment thereof substantially in the plane containing the line of contact of said annular sealing element and the inner surface of said non-metallic ring.

6. An apparatus according to claim 5, wherein
   said guiding means comprises means for limiting the extent of angular misalignment of the first and second tubes.

7. An apparatus according to claim 5, wherein said guiding means comprises
   a guide assembly including first and second arcuate ring members spaced apart to define an arcuate annular cavity therebetween, said first and second arcuate ring members being coupled to the second tube, and
   a follower assembly coupled to the first tube and having a follower movable in said cavity.

8. An apparatus according to claim 7, wherein said follower is arcuate.

9. An apparatus according to claim 7, wherein
   said follower comprises a third tube having a second non-metallic ring rigidly received therein via an interference shrink-fit between the outer surface of said second non-metallic ring and the inner surface of said third tube.

10. An apparatus according to claim 9, wherein
    said second non-metallic ring is formed of carbon-graphite.

11. An apparatus according to claim 7, wherein
    said guiding means comprises means for limiting the extent of angular misalignment of the first and second tubes, said means for limiting comprising
    a radially outwardly extending rim rigidly coupled to said follower, and
    a radially inwardly extending rim rigidly coupled to said first arcuate ring member,
    said rims engaging one another after a predetermined extent of angular misalignment of the first and second tubes.

12. An apparatus according to claim 7, wherein
    said guiding means comprises means for limiting the extent of angular misalignment of the first and second tubes, said means for limiting comprising
    a rim rigidly coupled to said first arcuate ring member and extending radially inward and towards the first tube,
    said follower engaging said rim after a predetermined extent of angular misalignment of the first and second tubes.

13. An apparatus according to claim 3, wherein said stop means comprises a plurality of fingers extending radially outward of and coupled to the outer surface of the first tube, and an outer restraint member rigidly coupled to said second tube and having a plurality of slots receiving said plurality of fingers therein.

14. An apparatus according to claim 1, and further comprising
a tubular flow liner rigidly coupled to the inside of said sealing element and extending inside said ring portion thereof.

15. An apparatus according to claim 1, and further comprising
an annular member coupled to the first tube and extending radially inward from the inner surface thereof, said non-metallic ring having an edge contacting said annular member.

16. An apparatus according to claim 15, wherein said annular member is integrally formed with the first tube.

17. An apparatus according to claim 15, wherein the first tube has an annular groove formed in the inner surface thereof, and
said annular member is a ring received in said annular groove.

18. A fluid-tight coupling and sealing apparatus for a first tube and a second tube having high pressure fluid flowing therethrough, the combination comprising:
a non-metallic ring rigidly received in the first tube via an interference shrink-fit between the outer surface of said ring and the inner surface of the first tube; and
a metallic, resilient, annular sealing element rigidly coupled to and extending from the second tube,
said sealing element having a ring portion with a curved outer surface having a maximum free diameter greater than the inner diameter of the inner surface of said non-metallic ring and in contact via an interference fit with the inner surface of said non-metallic ring,
the coefficient of friction between the material of said non-metallic ring and the material of said metallic sealing element being about 0.22.

19. A fluid-tight coupling and sealing apparatus for a first tube and a second tube having high pressure fluid flowing therethrough, the combination comprising:
a non-metallic ring having inner and outer surfaces and being rigidly received in the first tube via an interference shrink-fit between the outer surface of said ring and the inner surface of the first tube, said non-metallic ring inner surface being substantially cylindrical; and
a metallic, resilient, annular sealing element rigidly coupled to and extending from the second tube,
said sealing element having a ring portion with a curved outer surface defining a circular sealing line and having a maximum free diameter greater than the inner diameter of the inner surface of said non-metallic ring and in substantially line contact via an interference fit with the inner surface of said non-metallic ring,
the coefficient of friction between the material of said non-metallic ring and the material of said metallic sealing element being less than the coefficient of friction between the material of said metallic sealing element and the material of the first tube.

20. An apparatus according to claim 19, wherein said non-metallic ring is substantially rectangular in cross-section.

* * * * *